Figure 1:
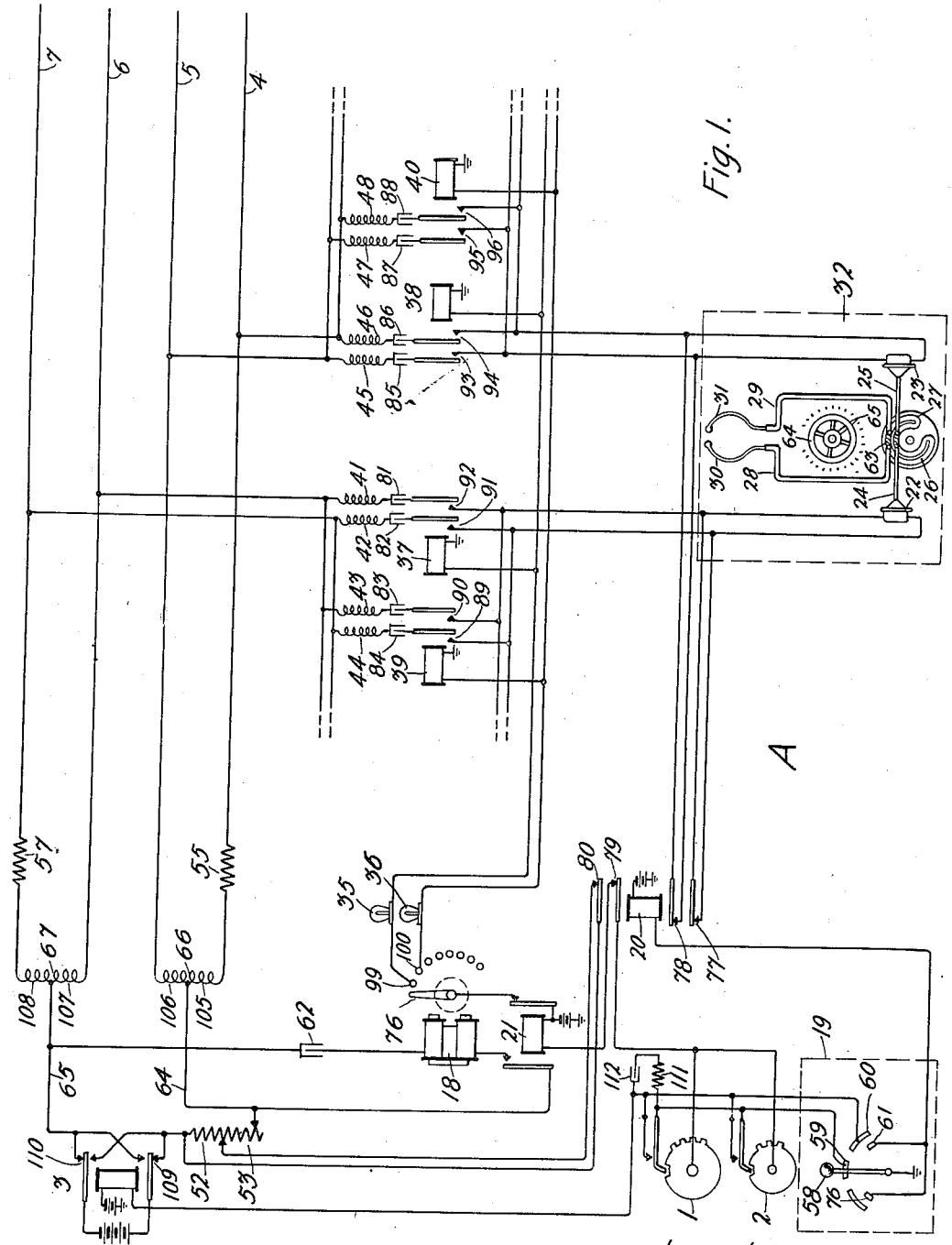

Nov. 11, 1924.

J. C. FIELD

SWITCHING SYSTEM

Filed July 5, 1919

1,514,844

2 Sheets-Sheet 1

Inventor:
Joseph C. Field.
by J. E. Roberts
Att'y.

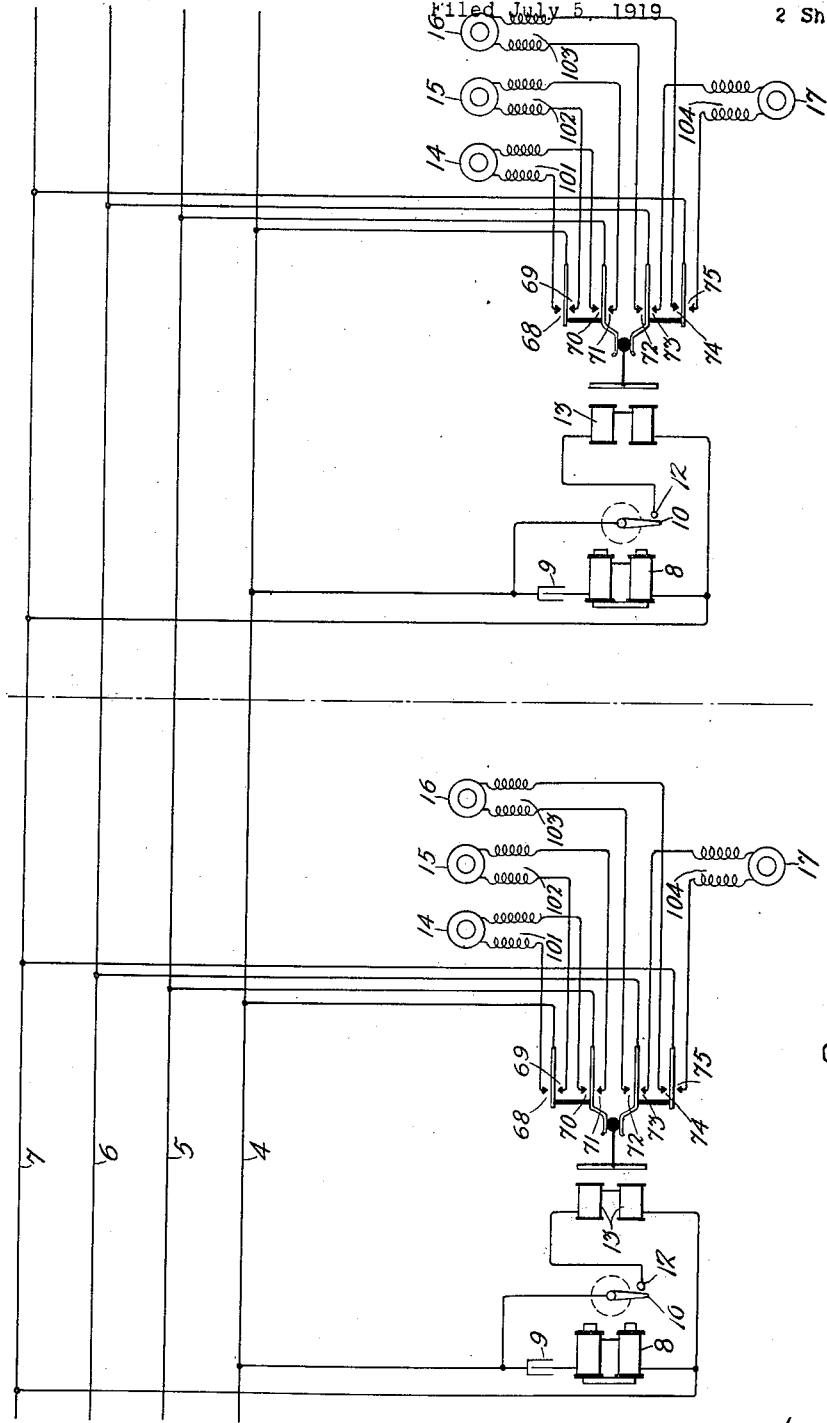

Patented Nov. 11, 1924.

1,514,844

UNITED STATES PATENT OFFICE.

JOSEPH C. FIELD, OF ORANGE, NEW JERSEY, ASSIGNOR TO WESTERN ELECTRIC COMPANY, INCORPORATED, OF NEW YORK, N. Y., A CORPORATION OF NEW YORK.

SWITCHING SYSTEM.

Application filed July 5, 1919. Serial No. 308,760.

*To all whom it may concern:*

Be it known that I, JOSEPH C. FIELD, a citizen of the United States, residing at Orange, in the county of Essex, State of New Jersey, have invented certain new and useful Improvements in Switching Systems, of which the following is a full, clear, concise, and exact description.

This invention relates to switching systems and particularly to such systems employed in connection with the detection of the presence of submarine or other marine vessels.

In such systems in which it is desired to selectively observe, individually or in binaural pairs, the current variations caused by submerged detecting devices arranged in fixedly positioned groups, in response to mechanical vibrations propagated through the water from a submarine or other source, it is desirable to provide means for readily and quickly selecting the detectors for such observation.

Since the groups of detectors may be placed at comparatively great distances from the observer's station, it is desirable to provide means for overcoming the effects of attenuation upon the quality of the transmission from the selected detectors.

Also, in order that the operation of the detectors may be accurately observed and compared, it is essential that each detector receive substantially the same amount of current irrespective of its distance from the observer's station.

It is an object of this invention to provide an improved system of this nature adapted for the selective observation of a plurality of detectors, each receiving substantially the same amount of current, in which system switching means is provided for maintaining a definite quality of transmission from the various detectors of the system.

To attain this object in accordance with one feature of the invention, selectors provided at each detecting station are individually responsive to a predetermined succession of alternating current impulses received over a circuit including one conductor each, of two common pairs of conductors from the observing station to associate with such circuit, observer controlled switching means for selectively associating the detectors at the selected station with the respective pairs of detectors.

In accordance with another feature, switching means operating synchronously with the station selector automatically associates with each pair of conductors attenuation equalizing means required to insure suitable transmission thereover from the selected station.

Another feature of the invention resides in providing a common resistance means for automatically adjusting the direct current supplied to the microphones or other current-varying devices operated by the detectors which provides substantially the same amount of current for the detectors irrespective of their distance from the observing station.

These and other features not specifically mentioned above will clearly appear from the following specification and the annexed drawing, Figs. 1 and 2 of which when placed end to end with Fig. 1 at the left, represent one embodiment of the invention as applied to a system for the detection of marine or submarine vessels producing mechanical vibrations which are propagated through the water.

Referring to the drawing, the apparatus shown in Fig. 1 may be provided at an observer's station A conveniently located upon the shore or elsewhere, while that shown in Fig. 2 represents the arrangement employed at the detecting stations. The apparatus for each such detecting station may be located upon a tripod or other suitable fixedly positioned framework. At the observer's station A, a plurality of sending devices connected in multiple, such as 1 and 2 of any suitable type, are provided for selectively causing reversing relay 3 to transmit alternating current impulses over conductors 4 and 7 of the transmission line circuits 4—5 and 6—7 extending to a plurality of selectable detecting way-stations such as B and C, only two of which are shown for the sake of clearness. Serially interconnected condenser 112 and resistance 111 shunt the contacts of the sending devices for the well-known purpose of absorbing sudden surges of current. At each detecting station, a selector such as 8, responsive to reversed current impulses is bridged across the conductors 4 and 7 in series with a condenser 9. These selectors are preferably of the type disclosed in Patent No. 1,343,256, issued June 15, 1920, although they may be of any suitable step-by-step type operated by alternating current impulses and capable of being adjusted to be individually retained by mechanical means in an advanced position responsive to a particular combination of alternating current impulses. Each selector controls the association of a polarized relay 13 with conductors 4 and 7 for selectively connecting detectors 14, 15, 16 and 17 at the associated station, arranged in pairs, with the transmission line circuits 4—5 and 6—7. These detectors may be of any suitable type adapted to vary the electrical characteristics of an associated circuit in response to mechanical vibrations propagated through the water. Retardation coils 101 to 104 inclusive are associated respectively with detectors 14 to 17 inclusive, to prevent sudden surges of current caused by the opening or closing of the circuit, from reaching and deleteriously affecting the current-varying devices. A step-by-step selector 18 similar to selector 8, but equipped with a plurality of contacts, at the observer's station A is also responsive to alternating current impulses supplied by the action of relay 3 through condenser 62, when associated with conductors 64 and 65 by the operation of relay 21. Supplementary switch 19 also controls relay 3 for selectively operating polarized relay 13 at the detecting station and controls relay 20 for rendering relay 21 ineffective, for varying the resistance in the battery supply circuit and for controlling the effectiveness of receivers 22 and 23 of a binaural observation set 32. Selector 18 also selectively controls station indicating lamps 35 and 36 and relays 37, 38, 39 and 40 for properly associating retardation coils or other impedance devices 41 to 48 inclusive, and condensers 81 to 88 inclusive, with the transmission line circuits 4—5 and 6—7 to overcome the attenuation losses. Ear pieces 30 and 31 of binaural observation set 32 receive sounds from receivers 22 and 23 through respective serially interconnected air tubes 24, 26, 28 and 25, 27, 29 respectively. A hand-wheel 64 controls a movable stop member 63 for varying the relatively effective lengths of tubes 26 and 27. The winding of relays 13 is of such high resistance that it practically determines the total amount of current supplied to a selected station independently of changes in the resistances of the line wires corresponding to differences in the distance of the detecting stations from the observing station. The resistances 55 and 57 are preferably slightly less than the normal resistance of a detector so that when associated in parallel paths with the detectors at the various detecting stations, the increase in the resistances of the line wires including such parallel paths due to increases in the distance of the detecting station from the observing station, cause a decrease in the ratio this difference bears to the individual paths. This decrease of the ratio, or the proportional difference, will cause the more distant detector to receive a slightly greater proportion of the total current than the detectors at a station located closer to the observing station.

It is thought that the invention may be more fully comprehended from the following description of the operation of the system shown on the drawings.

Assuming that the detectors at station B are to be observed, the sending device 1 is actuated, the first movement of the device causing the spring member thereof to engage the disc, operating relay 21 over a circuit extending from battery, through the winding of relay 21, the wheel and the engaged spring member of sending device 1, the contact 59, and the engaged arm 58 of switch 19 to ground. The winding of selector 18 is thereupon included in series with condenser 62 in bridge of conductors 64 and 65 and current supply is removed from arm 76 of selector 18. The engagement of the spring member with the first tooth of the sending device 1 operates relay 3 over a circuit established from battery, through the winding of relay 3, contact of sending device 1, and the contact 59 and arm 58 of switch 19 to ground. The polarity of the current supply normally connected to conductors 64 and 65 is thereby reversed. The subsequent disengagement of the member from the tooth opens the circuit just traced releasing relay 3 to again reverse the polarity of the current supply associated with the conductors 64 and 65. These reversed current impulses flow from one side of battery through a contact of relay 3, conductor 65, a portion of retardation coil 67, resistance 57, conductor 7, winding of the selector 8 and the associated condenser 9 at each station, conductor 4, resistance 55, a portion of retardation coil 66, conductor 64, resistance 53, and another contact of relay 3 to the other side of battery. The selectors at all stations advance one step in response to each such impulse, and selector 8 at station B being adjusted for selection in response to the particular series and group arrangement of impulses transmitted by the sending device 1 is mechanically retained in its advanced position with its arm 10 engaging its contact 12 upon the complete actuation of the sending device, while all other selectors at the other detecting stations, such as C, are restored to normal.

Selector 18 at the selecting station receiving the reversed current impulses through the condenser 62, advances step by step in response thereto, and is mechanically retained upon the cessation of the series with its arms 76 engaging contact 99. When the sending device 1 reaches its final position, its spring member disengages its wheel, thereby releasing relay 21. The opening of alternate contact of relay 21 removes the winding of selector 18 from its bridged relation to conductors 64 and 65, and the closing of its normal contact lights lamp 35 and operates relays 37 and 38 over a circuit extending from battery, through the normal contact of relay 21, the arm 76, and engaged contact 99 of master selector 18, the lamp 35, and the windings of relays 37 and 38 in parallel to ground. Lamp 35, being properly designated, upon being illuminated, indicates that station B has been selected. The operation of relay 37 completes a bridge across conductors 6 and 7 including retardation or impedance coil 41, condenser 81, contact 92 of relay 37, winding of receiver 22 of set 32, contact 91 of relay 37, condenser 82 and retardation or impedance coil 42. The operation of relay 38 completes a bridge across conductors 4 and 5 including retardation or impedance coil 46, condenser 86, contact 94 of relay 38, the winding of receiver 23 of set 32, contact 93 of relay 38, condenser 85, and retardation or impedance coil 45. Relay 13 at station B operates upon current supplied thereto from conductors 4 and 7, the direction of such current-flow being such as to cause relay 13 to close its contacts 68, 70, 72 and 74. The closure of contacts 68 and 70 bridges detector 14 across transmission line circuit 4—5, while the closure of contacts 72 and 74 bridges detector 16 across transmission line circuit 6—7.

Lever 58 is then actuated to engage contact 76, operating relay 20 over a circuit extending from battery, through the winding of relay 20 and the contact 67 and arm 58 of switch 19 to ground. The opening of contact 79 of relay 20 introduces a second break in the circuit of relay 21, while the opening of the contact 80 thereof removes a normal short-circuit existing around resistance 52, and the opening of contacts 77 and 78 thereof removes normal short-circuits existing around the windings of receivers 22 and 23 respectively of binaural observation set 32.

A circuit is now completed, extending from battery, through contact 110 of relay 3, conductor 65, thence through two parallel branches, one of which extends through winding 108 of retardation coil 67, resistance 57, conductor 7, to one terminal of the winding of relay 13 at station B while the other branch extends through winding 107 of retardation coil 67, conductor 6, contact 72 of relay 13, one winding of retardation coil 103, current-varying device of detector 16, the other winding of retardation coil 103, contact 74 of relay 13 and a portion of conductor 7 to the above-mentioned terminal of the winding of relay 13. From such terminal the circuit then extends through the winding of relay 13, to the contact 12 and the arm 10 of selector 8 and thence through two parallel branches, one of which extends through conductor 4, resistance 55 and winding 105 of coil 66 to conductor 64, while the other branch extends through a portion of conductor 4, contact 68 of relay 13, one winding of retardation coil 101, current-varying device of detector 14, the other winding of retardation coil 101, contact 70 of relay 13, conductor 5 and winding 106 of coil 66 to conductor 64. The circuit is completed through resistances 53 and 52 and contact 109 of relay 3 to the other side of the battery. Current variations produced by the vibration of detector 14 flow through the bridge established across conductors 4 and 5, while the current variations produced by the vibration of detector 16 flow through the similar bridge established across conductors 6 and 7. The sounds produced in the receivers 22 and 23, in response to these variations are conveyed through serially connected air tubes 24, 26, 28 and 25, 27, 29 respectively, to ear pieces 30 and 31. The relatively effective lengths of air tubes 26 and 27 are then varied by the shifting of stop member 63 by means of hand-wheel 64 until the observer, listening binaurally to the sounds emitted from the ear pieces 30 and 31, receives the impression that the source of sound is straight ahead. When this adjustment has been secured, the position occupied by pointer 65, in respect to its associated graduated scale, indicates the angular relation of the source of vibration to a base line joining detectors 14 and 16.

The lever arm 58 is then moved to engage contact 61. As the arm disengages contact 76, relay 20 is released to short-circuit the receivers 22 and 23 and the resistance 52, and to close an opening in the circuit of relay 21. Arm 58, subsequently engaging contact 60, causes the operation of relay 3 over an obvious circuit, to reverse the polarity of current applied to conductors 64 and 65, and in subsequently engaging contact 61 reoperates relay 20 to remove the short circuits from the receivers and from resistance 52 and to introduce another break in the circuit of relay 21, as previously described.

The direction of current now flowing through polarized relay 13 at station B is such as to cause such relay to open its previously closed contacts to disconnect detectors 14 and 16 from the previously traced circuits and to close contacts 69 and 71, bridging detector 15, in series with the respective windings of retardation coil 102, across conductors 4 and 5, and contacts 73 and 75, bridging detector 17, in series with the respective windings of retardation coil 104, across conductors 6 and 7. Such detors receive current over circuits similar to those described for detectors 14 and 16 except for the inclusion therein of the odd numbered contacts of relay 13 and the windings of retardation coils 102 and 104. The sounds emitted from ear pieces 30 and 31 in response to the current variations flowing through receivers 22 and 23 under these conditions are then observed as previously described, the position of the pointer 65 of the observation set indicating the angular relation of the source of vibration to a base line joining detectors 15 and 17.

The impedance and capacitance units controlled by relays 37 and 38 possess such characteristics that when placed in the bridges previously traced, the attenuation losses resulting in the circuit conductors connecting stations A and B are equalized so that the transmission over such conductors is maintained at a certain standard of equality in accordance with well known principles.

Lever arm 58 of switch 19 being returned to engage contact 59, relay 20 is released as the arm leaves contact 61 and relay 3 releases when the arm leaves contact 60, thereby sending another reversed current impulse over the line returning relay 13 to its formerly operated position in which detectors 14 and 16 are associated with the lines 4—5 and 6—7 respectively and detectors 15 and 17 are disconnected therefrom.

It will be noted that although selectors 8 are advanced one step in response to each impulse, they immediately thereafter restore to their mechanically retained positions or to normal as the case may be.

In case it is desired to reobserve the operation of the detectors at station B, arm 58 of switch 19 may be manipulated, as previously described, without the necessity of operating any sending or selecting device.

With arm 58 engaging contact 59, a sending device 2, similar to device 1, is actuated to transmit a characteristic series of impulses, differing from those produced by device 1, over the conductors 64 and 65. Such series is so arranged that selector 8 at station B and master selector 18 each disengage their mechanical holding means and restore to normal extinguishing lamp 35, releasing relay 13 at station B, and relays 37 and 38 at station A. Subsequently thereto, and in response to the series, selector 8 at station C which is similar to that shown at station B is advanced until its switch-arm 10 engages its contact 12 and is mechanically retained in that position, all other station selectors restoring to normal. Master selector 18, in response to the series of impulses, is advanced until its arm 76 engages contact 100, in which position it is also mechanically retained. Lamp 36 lights and relays 39 and 40 operate over a circuit established from battery, through the normal contact of relay 21, arm 76 and contact 100 of master selector 18, lamp 36, and the windings of relays 39 and 40 in parallel to ground. The illumination of lamp 36 indicates the selection of station C, while the operation of relay 39 completes a bridge across conductors 6 and 7 including retardation coil 43, condenser 83, contact 90 of relay 39, winding of receiver 22, contact 89 of relay 39, condenser 84 and retardation coil 44, and the operation of relay 40 completes a similar bridge across conductors 4 and 5 including retardation coil 48, condenser 88, contact 96 of relay 40, winding of receiver 23, contact 95 or relay 40, condenser 87 and retardation coil 47. The impedance and capacitance of these bridges are properly chosen to overcome the attenuation losses for station C. The operation of the detectors at station C may then be observed in the same manner as previously described for those at station B and the angular relation of the source of vibration to the base lines joining the various pairs thereof obtained in the same manner as described.

From the data obtained in this manner from all stations of the system, it will then be feasible to determine the location of the source of vibration with precision.

It will be noted that since resistances of coils 55 and 57 are slightly less than the normal resistance of the current-varying device of each detector, the parallel circuit arrangement of the battery supply circuit for such circuit-varying devices in which the resistance of each path increases uniformly for the distant stations insures the supply of substantially the same amount of current to the detectors irrespective of their distances from the source of current, such amount being primarily determined by the high resistance of the relay 13 of the selected station included in the operating circuit.

The normally short-circuited resistance unit 52 permits the use of the same source of current for selecting and for supplying the detectors with operating current, the current supplied to the conductors 64 and 65 being suitably reduced by the introduction of the resistance unit 52 in the operating circuit of the detector upon the completion of the selecting operations.

It will also be noted that no path for direct current exists to cause a current drain except at the selected station.

What is claimed is:

1. In a switching system, two pairs of line wires, a selecting and a plurality of way-stations associated therewith, a selector at each station responsive to impulses of current transmitted from the selecting station over a metallic circuit comprising one conductor of each pair of line wires, means at the selecting station for applying such impulses to such circuit, a plurality of detectors at each way-station, a second selecting device at each way-station normally disconnected from but adapted to be individually connected with the circuit upon the receipt by the first-mentioned selector of a predetermined series of impulses, and means controlled by said second selecting device selectively operating in response to impulses received thereafter from the selecting station to selectively bridge pairs of detectors at the selected station across the respective pairs of line wires.

2. In a signaling system, a plurality of pairs of conductors, a selecting station and a selectable station associated therewith, a signal receiver associated with each pair of conductors at said selecting station, a plurality of signal transmitters at said selectable station, a selector at said selectable station connected to one conductor of each of two different pairs, and means controlled by said selector for selectively bridging each of said signal transmitters across one of said pairs of conductors.

3. In a switching system, two pairs of line wires, a selecting and a plurality of way-stations associated therewith, a selector at each way-station responsive to impulses of current received over a circuit including one conductor of each pair of line wires, means at the selecting station for applying impulses of current to such circuit for advancing the selector at any station to a mechanically retained position, switching means at each way-station for connection with the circuit upon the advancement of the associated selector into the mechanically retained position, and a plurality of electrical devices at each way-station selectively connected to the pairs of line wires by the switching means.

4. In a switching system, a line circuit including a source of current, a receiving station and a transmitting station associated therewith, sound responsive means at the transmitting station, means at the receiving station cooperating with means at the transmitting station for completing a bridge across the line circuit at the transmitting station, means included in the bridge and controlled from the receiving station for including the sound responsive means in a circuit shunting one conductor of the line circuit, and receiving means at the receiving station included in a bridge from such conductor to the shunt circuit.

5. In a switching system, a line circuit including a source of current, a receiving station and a plurality of transmitting stations associated therewith, a plurality of transmitting means at each transmitting station, a selector at each transmitting station responsive to successive alternating current impulses received over the line circuit, means at the receiving station for intermittently reversing the polarity of the source of current to transmit current impulses of alternating polarity over the line circuit for advancing any selector to a predetermined position, electromagnetic means at each transmitting station connected to the line circuit upon the associated selector reaching its predetermined position, additional reversing means at the selecting station for determining the direction of current flow from the source to control the electromagnetic means, means controlled by the electromagnetic means to include an associated transmitting means in a circuit shunting each conductor of the line circuit, a plurality of receiving means at the receiving station, means controlled by the additional reversing means for bridging a receiving means from each shunted conductor to the associated shunt circuit, and means also controlled by the additional reversing means for increasing the resistance of the line circuit.

6. In a switching system, a plurality of pairs of conductors, a receiving station and a plurality of transmitting stations associated therewith, a source of current associated with said conductors, a signal receiver associated with each pair of conductors at said receiving station, a plurality of transmitters at each transmitting station, and means at each transmitting station controlled by code impulses impressed upon a circuit including one conductor each of a plurality of said pairs of conductors to selectively associate the transmitters with the pairs.

7. In a signaling system, a plurality of pairs of conductors, a single receiving station, a signal receiver thereat associated with each pair, a plurality of transmitting stations, a plurality of signal transmitters at each transmitting station, and means at each transmitting station controlled by code impulses impressed upon a physical circuit including one conductor each of a plurality of pairs to selectively associate the transmitters with the pairs.

8. In a signaling system, a plurality of pairs of conductors, a single receiving station, a signal receiver thereat for each pair, a plurality of sound responsive transmitters at each transmitting station, means at each transmitting station controlled by code impulses impressed upon a physical circuit including one conductor each of a plurality of the pairs, and additional means selectively associated thereby, with and thereafter controlled over such circuit to selectively associate the transmitters with the pairs.

9. In a switching system, a plurality of transmission line circuits each comprising a pair of conductors, a receiving station and a plurality of transmitting stations associated with said circuits, a plurality of transmitters at each transmitting station, means at each transmitting station controlled by code impulses impressed upon a circuit including one conductor of each of said pairs to selectively associate the transmitters with said pairs, a source of current at said receiving station, a receiver associated with each line circuit at said receiving station, inductance and capacity devices at said receiving station, and means responsive to the code impulses to selectively connect said devices in series with said transmission lines and said receivers to compensate for the attenuation losses of the portions of the transmission line circuits between the receivers and the selected transmitters.

10. In a switching system, a plurality of pairs of conductors, a source of current associated therewith, a plurality of electrical devices, step-by-step devices selectively responsive to current impulses for connecting said electrical devices with one conductor of each of two of the pairs of conductors, a plurality of other electrical devices, electromagnetic means for selectively associating the last-mentioned electrical devices with the pairs, and a compensating resistance permanently included in one conductor of each pair to regulate the current flow through the last-mentioned devices.

In witness whereof, I hereunto subscribe my name this 3rd day of July A. D., 1919.

JOSEPH C. FIELD.